United States Patent [19]
Rogers

[11] Patent Number: 6,064,407
[45] Date of Patent: May 16, 2000

[54] METHOD AND APPARATUS FOR TILING A BLOCK OF IMAGE DATA

[75] Inventor: Philip J. Rogers, Pepperell, Mass.

[73] Assignee: ATI Technologies, Inc., Thornhill, Canada

[21] Appl. No.: 09/070,247

[22] Filed: Apr. 30, 1998

[51] Int. Cl.[7] .................................................. G06F 12/06
[52] U.S. Cl. .......................... 345/516; 345/517; 711/202
[58] Field of Search ..................................... 345/516, 517, 345/508, 199, 523–525; 711/5, 202, 203

[56] References Cited

U.S. PATENT DOCUMENTS

5,990,912  11/1999  Swanson ................................. 345/516

Primary Examiner—Kee M. Tung
Attorney, Agent, or Firm—Markison & Reckamp, PC

[57] ABSTRACT

A method and apparatus for tiling a block of image data is accomplished by first receiving a set of parameters that describe the block of image data. An address is determined based on the set of parameters, and the address is translated to a corresponding tiled address. In translation, the address is first separated into horizontal and vertical coordinates. The horizontal coordinates are applied to a horizontal lookup table to obtain a horizontal component of a destination offset, and the vertical coordinates are applied to a vertical lookup table to obtain a vertical component. The horizontal and vertical components are then combined to produce the destination offset. The destination offset is added to a destination base pointer to produce the corresponding tiled address. Data is copied from the address to the corresponding tiled address. The address is then incremented, and the process is repeated for each address in the block of image data.

22 Claims, 5 Drawing Sheets

METHOD AND APPARATUS FOR TILING A BLOCK OF IMAGE DATA

FIELD OF THE INVENTION

The invention relates generally to video graphics processing and more particularly to a method and apparatus for tiling a block of image data.

BACKGROUND OF THE INVENTION

Computers are used in many applications. As computing systems continue to evolve, the graphical display requirements of the systems become more demanding. This is especially true in applications where detailed graphical displays must be updated quickly. One example of such an application is a computer game where movement and modification of background images may place great demands on the processing power of the computing system.

In order to display some screen images, detailed textures are stored in memory. These textures are then molded and adapted to overlay or map to structures for display. An example is a brick pattern that would be mapped onto a wall structure, where if the wall is extending into the distance, the texture will be mapped in such a way to show perspective.

When the surface to which particular texture is applied changes frequently, the texture must be retrieved from memory repeatedly to allow the display to be updated. These memory retrievals of the texture can consume a great deal of processing bandwidth, and may result in degradation in the speed of the overall program.

Consequently, a need exists for a system that will allow textures and other blocks of image data to be retrieved from memory in a faster, more efficient manner that minimizes the use of processing resources.

DETAILED DESCRIPTION OF A PREFERRED EMBODIMENT OF THE INVENTION

Generally, the present invention provides a method and apparatus for tiling a block of image data. This is accomplished by first receiving a set of parameters that describe the block of image data. An address is determined based on the set of parameters, and the address is translated to a corresponding tiled address. In translation, the address is first separated into horizontal and vertical coordinates. The horizontal coordinates are applied to a horizontal lookup table to obtain a horizontal component of a destination offset, and the vertical coordinates are applied to a vertical lookup table to obtain a vertical component. The horizontal and vertical components are combined to produce the destination offset. The destination offset is then added to a destination base pointer to produce the corresponding tiled address. Data is copied from the address to the corresponding tiled address. The address is then incremented, and the process is repeated for each address in the block of image data. By tiling the block of image data and using it in association with a graphics processor that includes a cache, the tiled format of the block of image data allows for more effective cache usage when portions of the block of image data are used repeatedly. This effective cache utilization reduces the amount of processing resources required to make use of the block of image data in a video graphics system.

Figure 1:
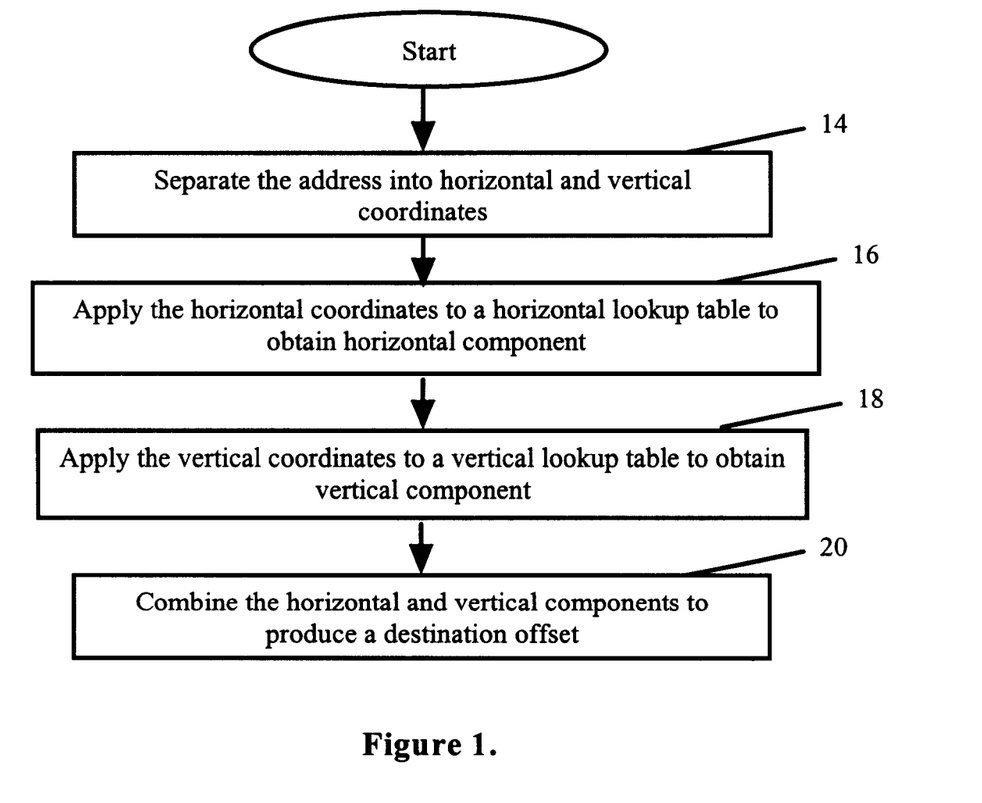
FIG. 1 illustrates a flow chart of a method for generating a destination offset in accordance with the present invention.

FIG. 1 illustrates a flow chart of a method for generating a destination offset for use in a tiling algorithm. The tiling algorithm may be used in a system that transforms image data stored in a linear format to image data stored in a tiled format. In other systems, the tiling algorithm may rearrange data stored in a first format to data stored in a second format. In the preferred embodiment, the transformation to a tiled format allows for more efficient use of a cache associated with the graphics processor. Benefits of such a modification are apparent in systems that reuse the image data frequently, one example of which is a graphics processing system that reuses texture data.

In order to tile the block of image data, data at each address in the block of image data must be copied to a corresponding address in the tiled block of image data. The address at which the data is stored in the block of image data is known as the source address for the copy operation. Blocks of image data are typically data arrays arranged in a rectangular format, where each address of the block has corresponding horizontal and vertical coordinates that define its location within the data array. The destination address, or the corresponding address in the tiled block of image data, is the address to which the data is copied. Preferably, the destination address is made up of a destination offset and a base pointer. In such a system, the base pointer marks a reference point for the tiled block of image data, and the destination offset is combined with this base pointer to form the destination address. In one embodiment, the base pointer may mark the first location of the portion of memory that stores the tiled block of image data, and the destination offset is a positive offset that is added to the base pointer to form the destination address.

The offset generation method of FIG. 1 begins at step 14, where the address, which is the source address as described above, is separated into its horizontal and vertical coordinates. The horizontal coordinates typically determine the position of the data along a particular row in the data array, and are represented in the address as less-significant bits than the vertical coordinates that determine the row in which the data resides.

At step 16, the horizontal coordinates are applied to a horizontal lookup table to obtain a horizontal component of the destination offset. The lookup table allows the horizontal component to be obtained more quickly than if the component had to be calculated for each set of horizontal coordinates. Many source addresses in the data array will share the same horizontal coordinates, and storing the horizontal component of the destination address, which is shared by all source addresses with these horizontal coordinates, eliminates repeated calculations. A preferred implementation of this algorithm generates the contents of this lookup table at initialization time from a single bit template that describes a remapping of the bits of the horizontal coordinates as a result of the tiling process At step 18, the vertical coordinates are applied to a vertical lookup table to obtain a vertical component of the destination offset. As in step 16, the storage of these shared components in a lookup table saves the processor from having to recalculate each portion of the destination offset. At step 20, the horizontal and vertical components are combined to produce the destination offset. The combination of these components may be performed via a bit-wise OR operation, wherein bits in the horizontal component are unused by the vertical component and vice-versa.

The destination produced by the method illustrated in FIG. 1 can then be added to a destination base pointer in order to determine a destination offset for a tiling routine. The horizontal and vertical lookup tables are created based on the tiling algorithm such that the resulting data is interleaved in a predetermined manner that puts data located proximally in terms of screen display in a similar proximal relationship in memory. This is different than the relationship which exists in linearly-stored data, where entire rows of data are stored sequentially in memory such that data at the end of one row is stored next to data that begins the following row. Data stored proximally in memory is more likely to be resident in a cache simultaneously. Therefore, when an operation requires multiple data points in a certain area, it is more likely to find the data points in the cache if the data is tiled. Because cache access time is shorter than the access time for a frame buffer and many other memory elements where data is stored, these operations using the cache can retrieve data faster and therefore complete their tasks more efficiently and in less time.

Figure 2:
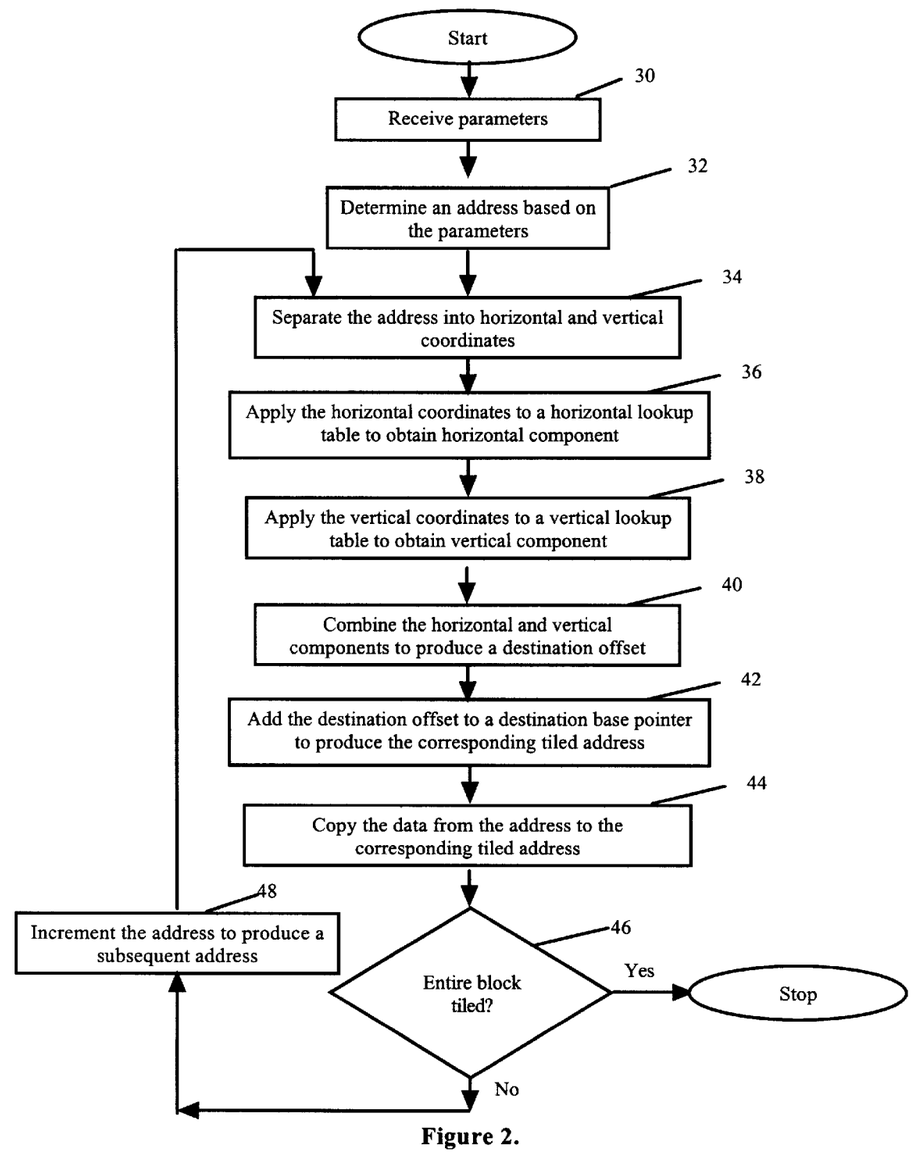
FIG. 2 illustrates a flow chart of a method for tiling a block of image data in accordance with the present invention.

FIG. 2 illustrates a method for tiling a block of image data, where the block of image data may be a texture used in a video graphics system. Preferably, the method is accomplished through a software routine that executes on a processor in a video graphics system. Because most software functions can be implemented with specialized hardware, it should be apparent to one skilled in the art that the method could be accomplished using such circuitry or through a combination of software and circuitry.

At step 30 a set of parameters is received that describes the block of image data. In a software implementation, the parameters may be passed by a software routine that is calling the tiling routine. Preferably, the parameters include the location of the source block of image data, characteristics that describe the physical makeup of the block of image data, and a destination at which to place the tiled block of image data. The characteristics that describe the block of image data can include the width of the block, the height of the block, and the number of bytes per data point in the block. When the block of image data is a texture, each data point is a texel. In the preferred embodiment, a texel is described by either 1, 2 or 4 bytes (8, 16 or 32 bits). Another parameter that may be passed to the routine is whether the block of data should be tiled or untiled. It should be apparent to one skilled in the art that the tiling algorithm can easily be modified to untile a block of image data that has been tiled using the algorithm.

At step 32, an address is determined based on the set of parameters. In a tiling operation, the source data is copied to the destination in a way that interleaves the data. At the source, the data is arranged in a linear format, and there are two preferred techniques that can be used to tile the data. The most preferred technique is to read the data sequentially, and generate the interleaved address before writing the data. Alternatively, the data can be read based on the tiling pattern and then written sequentially at the destination. It should be obvious that the data can be read and written in various other ways to accomplish the desired tiling or interleaving pattern. In the preferred embodiment where the data is read sequentially, the destination address for the tiled data can be generated during the time that the read cycle is occurring. This can shorten the total time that it takes to transfer each piece of data, and therefore can reduce the time the overall tiling process takes.

The process of generating the destination address or corresponding tiled address for a particular piece of data begins at step 34. At step 34, the address determined at step 32 is separated into horizontal and vertical coordinates. These coordinates describe where the data to be read is located within the data block. If the data block is rectangular, the horizontal coordinates determine the location of the data in a particular row, and the vertical coordinates determine the row in which the data resides.

At step 36, the horizontal coordinates are applied to a horizontal lookup table to obtain a horizontal component of a destination offset. Similarly, at step 38, the vertical coordinates are applied to a vertical lookup table to obtain a vertical component of the destination offset. The horizontal and vertical lookup tables allow for generation of the corresponding tiled address without the calculation steps that would normally be required for each component of the address. The lookup tables take advantage of the fact that a group of source addresses will share a certain number of common bits with regard to their destination addresses. In other words, the horizontal coordinates of many source addresses will be the same, and these addresses will have matching bits in certain portions of their corresponding tiled addresses. The lookup table stores these bits, and by using the two lookup tables, the entire destination offset can be produced. Different lookup tables may be used for data points of different sizes. For example, in a video graphics system, there may be lookup tables for 8-bit texels, another set for 16-bit texels, and another set for 32-bit texels. Separate lookup tables allow for adaptation to the texel size, and also for the different interleaving patterns that may be used with each size texel.

The lookup tables may be produced in many ways. For example, they may be generated at the beginning of execution of the tiling algorithm, they may be generated at some other time by a separate software routine designed to do so, or they may be stored in a memory structure such as a Read Only Memory (ROM). Numerous lookup tables may be pre-stored in memory or pre-generated by software, and then chosen from based on the set of parameters.

At step 40, the horizontal and vertical components obtained in steps 36 and 38 are combined to produce the destination offset. At step 42, the destination offset is added to a destination base pointer to produce the corresponding tiled address. As described with regard to FIG. 1, the destination offset is combined with a base pointer to produce the corresponding tiled (destination) address. However, in other embodiments, the entire destination address can be produced by combining the horizontal and vertical components. In addition to this, the destination offset may be combined with the base pointer in some other manner than addition. Some examples include subtraction and bit-wise binary operations such as a bit-wise logical AND.

At step 44, the data is copied from the source address that was determined at step 32 to the corresponding tiled address. At step 46, it is determined if data at each address in the block of image data has been copied which indicates that the entire block has been tiled. If all of the data has been copied, the tiling is complete. If not, the method proceeds to step 48 where the address is incremented to produce a subsequent address. Note that the step of incrementing may be different from simply adding a value such that the address steps forward one location. In a system where the untiled data is being read in a non-sequential manner, incrementing performs the steps necessary to advance to the next piece of data to be read. Once the address has been incremented, the method repeats beginning with step 34 and may continue until the entire block of image data is tiled.

Figure 3:
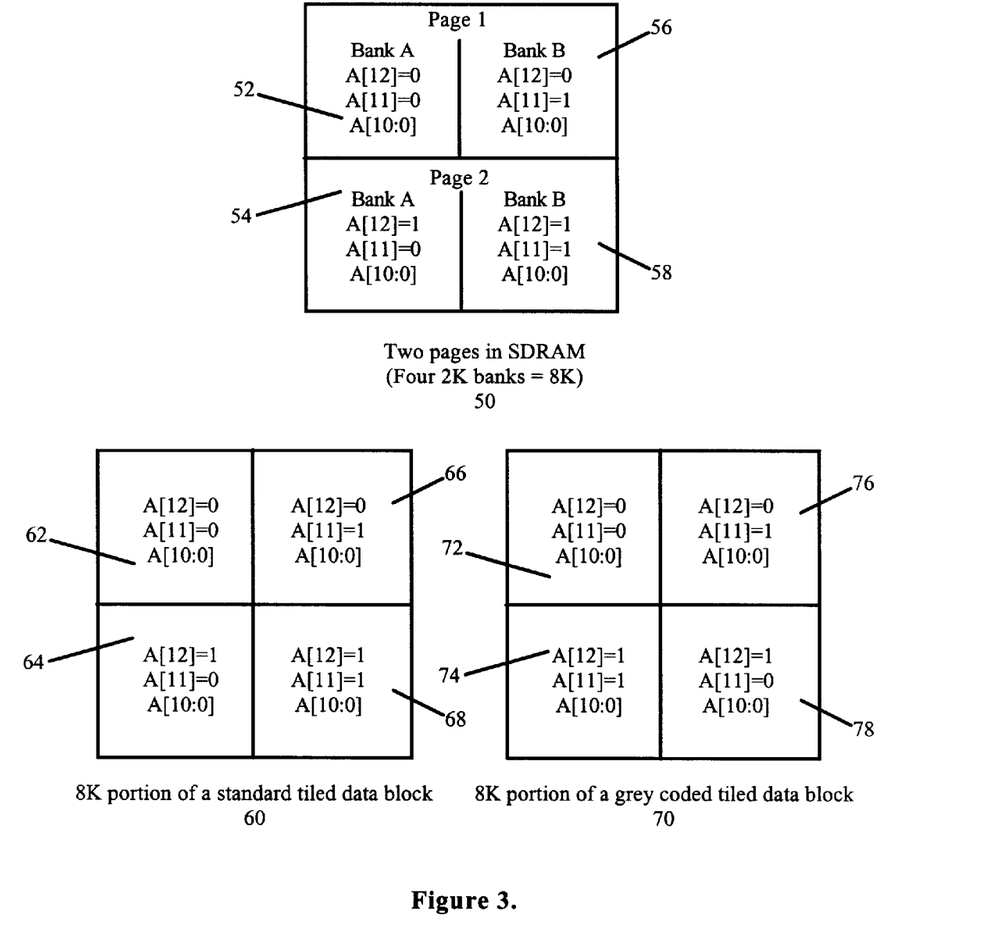
FIG. 3 illustrates a block diagram of tiled portions of data block in accordance with the present invention.

In order to maximize the efficiency of memory accesses in some systems, the tiling pattern may be modified in some areas to place some sections of the block of data in certain related locations with respect to other sections. FIG. 3 illustrates how this concept may be beneficial. FIG. 3 shows a portion of a memory 50, which is preferably Synchronous DRAM (SDRAM) or Synchronous Graphics RAM (SGRAM), and two example portions 60 and 70 of tiled data blocks. In the example illustrated, the portion of the memory 50 includes two pages, and each page is capable of storing 4K of data in two 2K banks, labeled Bank A and Bank B. In order to store 8K of data, the memory portion 50 uses thirteen address bits, which are represented by A[12:0] where A[12] is the most significant bit (MSB) and A[0] is the least significant bit (LSB). The memory portion 50 is divided into four 2K sections 52, 54, 56, and 58. Page 1 includes sections 52 and 56. Addresses in these sections 52 and 56 have an MSB that is equal to zero (A[12]=0). Page 2 includes sections 54 and 58, and addresses in these sections have an MSB that is equal to one (A[12]=1).

Example portion 60 shows a standard tiled portion of a data block. This represents a portion of the data block that has been tiled according to the basic tiling technique. Block portion 60 is divided into four 2K sections 62, 64, 66 and 68. As is illustrated, blocks 62 and 64 both have address bit A[11] set to zero (A[11]=0). Thus, when mapped into the memory portion 50, these blocks will occupy section 52 or section 54 of the memory portion 50. Similarly, sections 66 and 68 have bit A[11] set to one (A[11]=1), and these sections will map to sections 56 or 58 of the memory portion 50.

In SDRAMs (including SGRAMs), there is a penalty when successive reads come from different 4K pages of memory. However, this penalty is substantially reduced when the access from the second page is from the opposite bank with respect to the read that occurred from the first page. In the tiled address case, A[12] and A[11] are often from different texture coordinates. (e.g., A[12] may be T[n] and A[11] may be S[n]) This means that when fetching texels for a 2×2 blend from two successive rows of a texture, A[12] will vary while A[11] remains constant. Therefore, it is desirable for the transition of address bits A[12:11] from 00 to 10 to result in fetches from different banks, which does not occur in a standard tiled data block.

One way of avoiding this condition is to grey code a portion of each destination address when tiling the block of image data. Block portion 70 of FIG. 3 illustrates a grey-coded tiled portion of the data block. Grey coding is well known in the art for eliminating multiple bit transitions at boundaries. The normal two-bit binary counting sequence is 00, 01, 10, 11. This counting sequence matches the values of address bits A[12:11] of the standard tiled portion 60. The sections are taken in order from left to right, top to bottom. Note that when the sequence moves from 01 to 10, both bits transition to the other state. A grey coded sequence rearranges the counting sequence to avoid this, making the new sequence 00, 01, 11, 10. This sequence corresponds to address bits A[12:11] of grey-coded tiled portion 70.

In order to increase the efficiency of the memory, grey coding only needs to take place at address bits that define the boundaries of pages of the memory. Thus, in the example shown, address bits A[12:11] are grey coded. This can be accomplished by taking the A[12] address bit that is generated in a standard tiling technique and exclusiveoring (XORing) it with the A[11] address bit to produce a new A[11] address bit.

One advantage of a grey-coded block, such as block 70, is that data on both sides of most section boundaries that are not on the same page can reside in different banks. Address bit A[11] determines which bank of the memory portion 50 a particular section will map to, and as can be seen, section 72 will map to either section 52 or 54 of the memory portion 50. Section 72 shares borders with sections 76 and 74, both of which will map to either section 58 or 56 of the memory portion 50 because their A[11] bit is equal to one (logical high). Thus, transitions on bit A[11] will move between banks A and B of the memory portion 50, thus reducing the potential penalty from successive reads from different pages. In the method illustrated by FIG. 2, grey coding can be performed on the destination offset or on the corresponding tiled address in order to allow neighboring sections of the tiled block of image data to be in differing banks of memory pages. The address bits which are grey coded depends on the memory page bank size and the tiling interleave pattern. The bits which are grey coded correspond to the boundary of banks of the memory pages.

Figure 4:
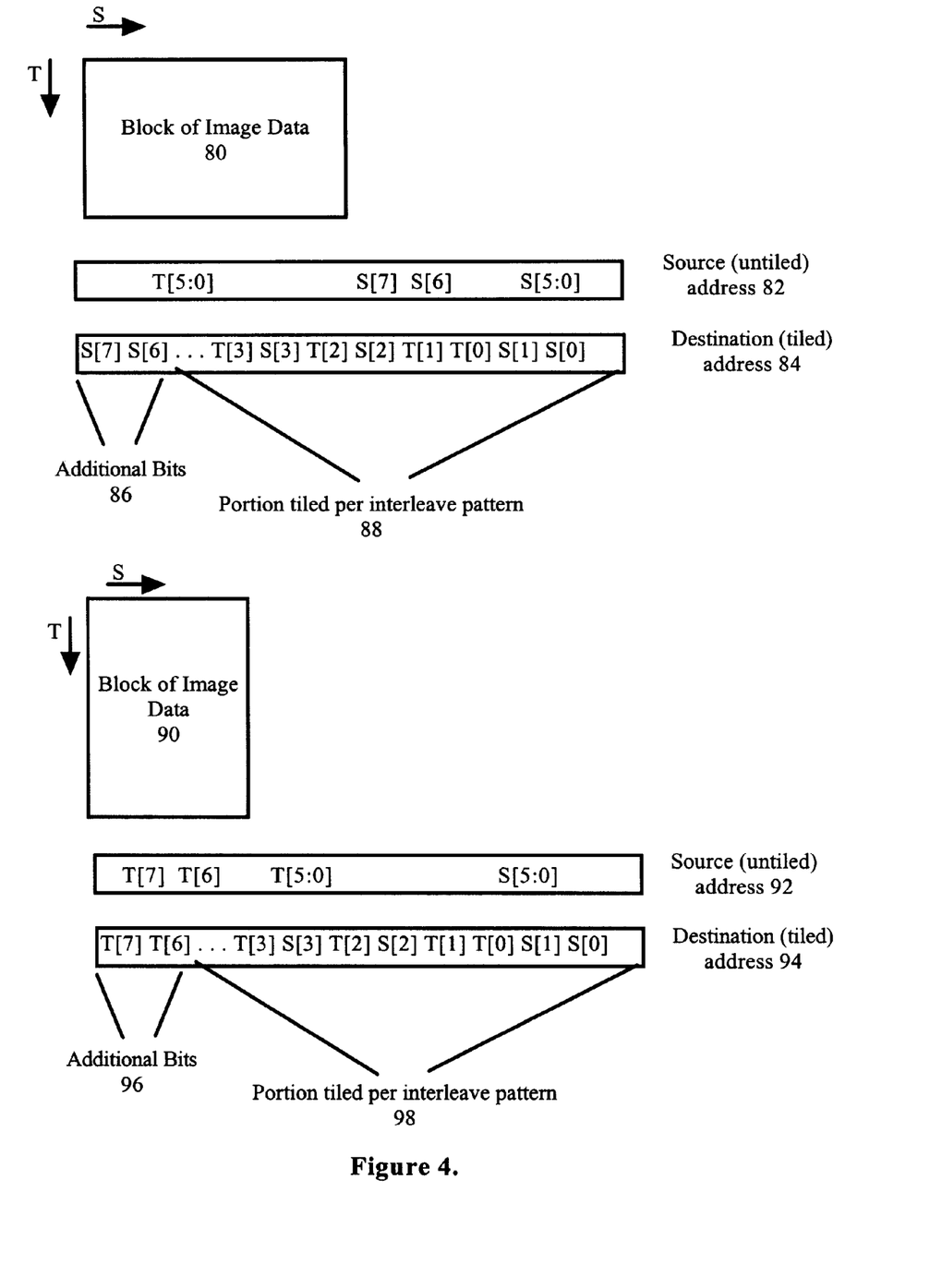
FIG. 4 illustrates a block diagram of tiling rectangular blocks of image data in accordance with the present invention.

Preferably, tiling or interleaving is performed based on square sections of the block of image data. In the case where the horizontal dimension of the section exceeds the size of the vertical dimension, or vice-versa, generating the corresponding tiled address (destination address) for a particular source address may involve special treatment of some of the address bits, relative to the more straightforward treatment for square textures. FIG. 4 illustrates two blocks (or sections of blocks) of image data 80 and 90. The block 80 has a horizontal dimension, labeled "S", that is larger than its vertical dimension "T", whereas block 90 has a larger vertical dimension than horizontal dimension.

The source address 82 for block 80 includes six vertical address bits T[5:0] and eight horizontal address bits S[7:0]. Preferably, the interleaving pattern will only interleave the two sets of address bits up until bits T[5] and S[5] at which point it will simply append bits S[7:6] at the most significant end of the address to produce the destination address 84. To produce destination address 84, the additional bits S[7:6] may be masked out of the horizontal portion of the address before the horizontal coordinates are applied to the horizontal lookup table. These additional bits 86 can then be combined with the results from the two lookup tables 88 to produce the destination offset. In the case where there are additional horizontal bits 86 as in source address 82, these additional bits 86 may be bit-wise shifted to the left by the number of bits in the vertical dimension and then combined with the lookup table results 88 with a bit-wise OR function.

The block of image data 90 has a larger vertical dimension than horizontal dimension, and, in the example shown, its source address 92 has two extra address bits that describe the vertical coordinates. Therefore, a destination address 94 will have these additional bits 96 placed in a more significant location than the portion 98 which was tiled based on the interleave pattern. Note that no shifting is required to reposition these additional bits 96 before they can be combined with the results of the lookup tables via a bit-wise OR.

If the tiling operation is performed on blocks that are so small that they don't have enough address bits in either or both dimensions to comply with the interleave pattern, special tiling solutions may be provided. The tiling method of FIG. 2 may further include a step which detects when the received parameters describing the block of image data are such that the block must be tiled based on an exception to the standard interleave pattern.

Take, for example, an interleaving pattern that normally produce the six least significant interleaved bits as follows:

T[2]S[2]T[1]T[0]S[1]S[0]

If the dimensions of the block of image data are such that there are only two horizontal coordinate bits (S bits), the vertical lookup table will still place bit T[2] in the sixth least significant location, even though there is no S[2] bit. This case must be detected and corrected for by shifting the T[2] bit over to the right in the position where the S[2] bit would reside if it existed. This problem only occurs in very small blocks, and the number of problem-sized blocks is small enough that each case can be dealt with individually. In such cases, the lookup tables may be bypassed.

Figure 5:
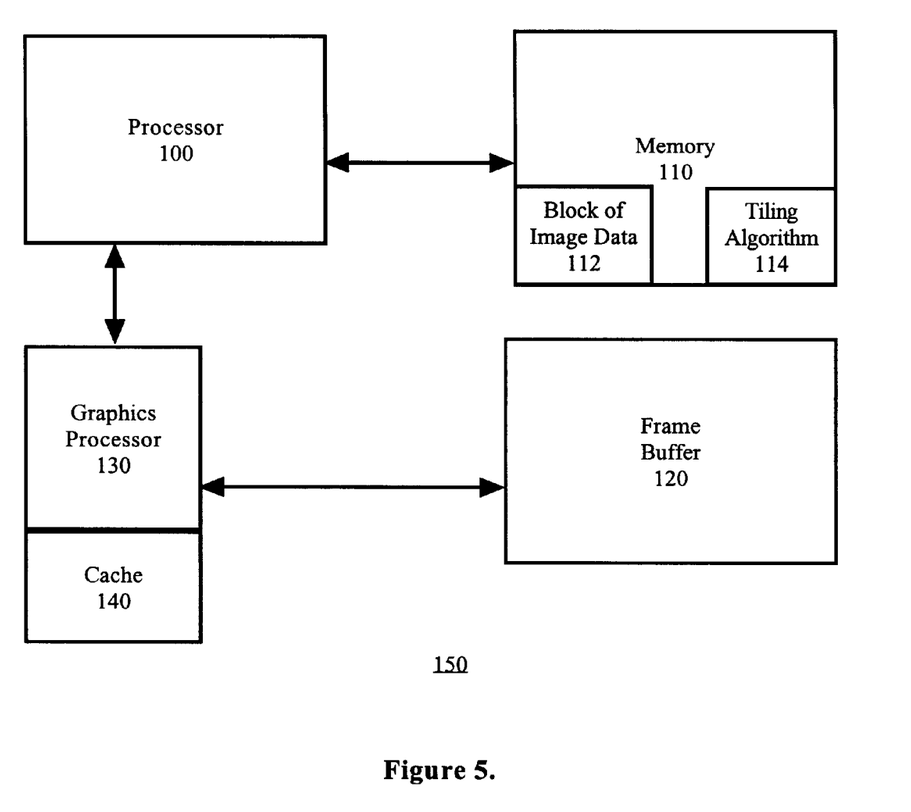
FIG. 5 illustrates a block diagram of a video graphics processing system in accordance with the present invention.

FIG. 5 illustrates a system 150 that can benefit from tiling of a block of image data. The system 150 may be a video graphics system, and the block of image data may be texture that is reused often. In such an embodiment, the system would benefit from caching some or all of the texture data. System 150 includes processor 100 and memory 110. Memory 110 may be a Random Access Memory (RAM), ROM, or any other type of computer readable storage medium. Memory 110 stores a tiling algorithm 114 and a block of image data 112. Memory 110 may include a RAM that stores the block of image data 112 and a ROM or other storage medium such as a disk that stores the tiling algorithm 114.

When executed by the processor 100, the tiling algorithm 114 causes the processor 100 to perform the functions described with respect to FIGS. 1–4 above such that the block of image data 112 is copied to another location in a tiled format. The system or apparatus 150 may further include frame buffer 120 that is used to store the tiled block of image data for use. In such a system, the data may be read from the memory 110 and written to the frame buffer 120 based on the tiling algorithm 114.

The system 150 may also include a graphics processor 130 having a cache memory 140. The graphics processor 130 reads tiled image data from the frame buffer 120 and constructs a derived image for display based on the image data stored in the frame buffer 120. Some of the image data may be stored in the cache 140 for future use, and because at least a portion of the image data in the frame buffer 120 is tiled, usage of the cache 140 will be more efficient than in systems where the data is stored in linear format.

Software that causes a processor to perform the functions of the methods illustrated herein may be stored in any manner of computer readable medium, including, but not limited to, a diskette, magnetic tape, ROM, RAM, a hard disk, or a CD-ROM. Execution of the software by a processor will cause the processor to operate in a specific and predetermined manner such that it performs the steps or functions required by the methods described above. As stated earlier, some of the steps or functions may be performed by circuitry or hardware, whereas other steps or functions are performed in software.

It should be understood that the implementation of other variations and modifications of the invention in its various aspects will be apparent to those of ordinary skill in the art, and that the invention is not limited by the specific embodiments described. For example, a texture or other block of image data may be rearranged based on a pattern other than a tiling pattern. This alternate pattern may, however, benefit from the use of lookup tables to generate destination addresses for the rearranging operation. It is therefore contemplated to cover by the present invention, any and all modifications, variations, or equivalents that fall within the spirit and scope of the basic underlying principles disclosed and claimed herein.

What is claimed is:

1. A method for tiling a block of image data comprising:
   a) receiving a set of parameters that describe the block of image data;
   b) determining an address based on the set of parameters;
   c) translating the address to a corresponding tiled address, wherein translating includes:
      separating the address into horizontal and vertical coordinates that describe a location within the block of image data;
      applying the horizontal coordinates to a horizontal lookup table to obtain a horizontal component of a destination offset;
      applying the vertical coordinates to a vertical lookup table to obtain a vertical component of the destination offset;
      combining the horizontal component and the vertical component to produce the destination offset; and
      adding the destination offset to a destination base pointer to produce the corresponding tiled address; and
   d) copying data from the address to the corresponding tiled address.

2. The method of claim 1 further comprises:
   e) incrementing the address to produce a subsequent address; and
   f) repeating steps (c) through (e) using the subsequent address until data at each address of the block of image data has been copied such that a tiled block of image data is produced.

3. The method of claim 1 wherein step (c) further comprises grey coding a portion of the destination offset based on memory page bank size and filing interleave pattern.

4. The method of claim 3, wherein grey coding further comprises performing an exclusive-or operation on boundary bits in the destination offset, wherein the boundary bits correspond to boundaries of memory page banks.

5. The method of claim 1 further comprises generating the horizontal and vertical lookup tables.

6. The method of claim 1 further comprises selecting the horizontal and vertical lookup tables from a predetermined set of lookup tables.

7. The method of claim 1, wherein when the block of image data is rectangular such that there is a larger dimension and a smaller dimension,
   separating the address further comprises separating the address into the horizontal coordinates, the vertical coordinates, and additional coordinates, and
   combining further comprises combining the horizontal component, the vertical component, and the additional coordinates to produce the destination offset.

8. The method of claim 7, wherein when the larger dimension corresponds to a horizontal dimension, the step of combining further comprises bit-wise shifting the additional coordinates to the left by a number of bits in the vertical coordinates.

9. The method of claim 1, wherein separating the address further comprises applying bit masks to the address to separate the address.

10. An apparatus for tiling a block of image data comprising:
   a processor;
   a memory operably coupled to the processor, wherein the memory stores a tiling algorithm and a block of image data, wherein when executed by the processor the tiling algorithm causes the processor to perform the function of:
   a) determining an address based on a set of parameters, wherein the set of parameters describes the block of image data;
   b) translating the address to a corresponding tiled address, wherein translating includes:
      separating the address into horizontal and vertical coordinates that describe a location within the block of image data;
      applying the horizontal coordinates to a horizontal lookup table to obtain a horizontal component of a destination offset;
      applying the vertical coordinates to a vertical lookup table to obtain a vertical component of the destination offset;
      combining the horizontal component and the vertical component to produce the destination offset; and
      adding the destination offset to a destination base pointer to produce the corresponding tiled address;
   c) copying data from the address to the corresponding tiled address;
   d) incrementing the address to produce a subsequent address; and
   e) repeating steps (b) through (d) using subsequent addresses until data at each address of the block of image data has been copied such that a tiled block of image data is produced.

11. The apparatus of claim 10 further comprises a frame buffer operably coupled to the processor, wherein the processor copies data from addresses in the block of image data to corresponding tiled addresses in the frame buffer such that the tiled block of image data is produced in the frame buffer.

12. The apparatus of claim 11 further comprises a graphics processor operably coupled to the frame buffer, wherein the graphics processor includes a cache memory, wherein the graphics processor reads the tiled block of image data and constructs a derived image for display based on the tiled block of image data, wherein the cache stores portions of the tiled block of image data.

13. The apparatus of claim 10 wherein the algorithm further includes instructions such that step (c) of the function performed by the processor further comprises grey coding a portion of the destination offset based on memory page bank size and tiling interleave pattern.

14. The apparatus of claim 13 wherein the algorithm further includes instructions such that grey coding performed by the processor further comprises performing an exclusive-or operation on boundary bits in the destination offset, wherein the boundary bits correspond to boundaries of memory page banks.

15. The apparatus of claim 10 wherein the algorithm further includes instructions such that the function performed by the processor further includes generating the horizontal and vertical lookup tables.

16. The apparatus of claim 10 wherein the algorithm further includes instructions such that the function performed by the processor further includes selecting the horizontal and vertical lookup tables from a predetermined set of lookup tables.

17. The apparatus of claim 10 wherein the algorithm further includes instructions such that the function performed by the processor further includes:
   when the block of image data is rectangular such that there is a larger dimension and a smaller dimension,
   separating the address further comprises separating the address into the horizontal coordinates, the vertical coordinates, and additional coordinates, and
   combining further comprises combining the horizontal component, the vertical component, and the additional coordinates to produce the destination offset.

18. The apparatus of claim 10, wherein the block of image data describes a texture for use in a video-graphics processing system.

19. A computer-readable storage medium storing a computer program for tiling a block of image data, wherein the computer-readable storage medium so configured causes a computer to operate in a specific and predetermined manner to perform the functions of:
   a) receiving a set of parameters that describe the block of image data;
   b) determining an address based on the set of parameters;
   c) translating the address to a corresponding tiled address, wherein translating includes:
      separating the address into horizontal and vertical coordinates that describe a location within the block of image data;
      applying the horizontal coordinates to a horizontal lookup table to obtain a horizontal component of a destination offset;
      applying the vertical coordinates to a vertical lookup table to obtain a vertical component of the destination offset;
      combining the horizontal component and the vertical component to produce the destination offset; and
      adding the destination offset to a destination base pointer to produce the corresponding tiled address;
   d) copying data from the address to the corresponding tiled address;
   e) incrementing the first address to produce a subsequent address; and
   f) repeating steps (c) through (e) using the subsequent address.

20. The computer-readable storage medium of claim 19 further configured such that, within the functions performed by the computer, step (c) further comprises grey coding a portion of the destination offset based on memory page bank size and tiling interleave pattern.

21. The computer-readable storage medium of claim 20 further configured such that, within the functions performed by the computer, grey coding further comprises performing an exclusive-or operation on boundary bits in the destination offset, wherein the boundary bits correspond to boundaries of memory page banks.

22. The computer-readable storage medium of claim 19 further configured such that, the functions performed by the computer further include generating the horizontal and vertical lookup tables.

* * * * *